United States Patent [19]
Tally

[11] 3,992,505
[45] Nov. 16, 1976

[54] METHOD FOR PRODUCING CURVED ELASTOMERIC TUBULAR ARTICLES

[75] Inventor: David N. Tally, Arvada, Colo.

[73] Assignee: The Gates Rubber Company, Denver, Colo.

[22] Filed: Aug. 18, 1975

[21] Appl. No.: 605,585

[52] U.S. Cl. .............................. 264/295; 264/317; 264/339
[51] Int. Cl.² .......................................... B29H 5/18
[58] Field of Search ........... 264/317, 320, 347, 339, 264/DIG. 44, 295

[56] References Cited
UNITED STATES PATENTS

| | | | |
|---|---|---|---|
| 1,877,628 | 9/1932 | Reploge | 264/317 |
| 1,880,053 | 9/1932 | Schur | 264/320 X |
| 2,389,038 | 11/1945 | German | 264/317 |
| 2,525,285 | 10/1950 | Collins | 264/295 X |
| 2,525,662 | 10/1950 | Freeman | 264/347 X |
| 3,645,491 | 2/1972 | Brown | 264/DIG. 44 |
| 3,753,635 | 8/1973 | Barnett | 264/339 X |

Primary Examiner—Richard R. Kucia
Attorney, Agent, or Firm—Curtis H. Castleman, Jr.; Raymond Fink; H. W. Oberg, Jr.

[57] ABSTRACT

The method includes filling the hollow interior of a flexible uncured tubular preform with a flowable substantially incompressible material, training the thus filled tubular element about discrete support means which contact a portion of the exterior surface of the tubular element to form the desired serpentine configuration, and then curing the filled, serpentined tubular element followed by totally discharging the incompressible material from the interior of the tubular element.

14 Claims, 2 Drawing Figures

METHOD FOR PRODUCING CURVED ELASTOMERIC TUBULAR ARTICLES

BACKGROUND OF THE INVENTION

This invention relates to methods for producing curved elastomeric tubular articles such as hose.

A customary method for manufacturing curved hose, suitable as radiator coolant hose, for instance, involves the steps of preparing a length of uncured, flexible hose consisting of an inner tube, an outer cover, and a reinforcement positioned therebetween, and then loading the green preform onto a curved rigid metal mandrel. The hose length is then cured in an open steam autoclave while mounted on the mandrel, and then removed from the mandrel as a finished product. While this rigid mandrel process has proved largely satisfactory, serpentine configurations having extremely acute bends, which may be in three dimensions, are virtually impossible to build on rigid curved mandrels. Not only is it difficult to load and unload the hose element with these prior methods, but also problems with respect to hot tear and creasing at the inside surface of the bends arise which eventually lead to premature failure of the hose in operation.

The use of granular material such as sand is known as a flexible mandrel material in the production of curved tubular articles, such as disclosed in U.S. Pat. No. 1,877,628 to Replogle. However, the use of sand as a mandrel core in the preparation of curved hose is not satisfactory inasmuch as it produces a rough, stippled or porous interior surface upon curing; sand particles lodge within such pores and are virtually impossible to totally remove by flushing after cure. The occurrence of even residual amounts of sand in the hose may foul the water pump in the cooling system of an automobile. Other relevant art includes U.S. Pat. No. 2,974,079 to Korotkevich which discloses the use of a solid volatile or vaporizable mandrel used for splicing or joining the butted ends of hollow members of extruded rubber or plastic such as elastomeric aircraft seals.

It is a primary object of this invention to provide a method for producing serpentine configurations from elastomeric tubular material which may include extremely acute bends, using a flexible mandrel material which is totally removable from the element upon curing.

SUMMARY OF THE INVENTION

Briefly described, the method of the invention entails preparing a flexible at least partially uncured length of an elastomeric tubular preform; filling the hollow interior of the preform with a flowable substantially incompressible material which is capable of total removal from the hollow interior upon curing of the article; training the thus filled tubular element about discrete support means in contact with only a portion of the exterior surface of the tubular element, in a manner so as to dispose the tubular element in substantially its serpentine configuration while precluding the bend portion(s) from collapse; and curing the filled, serpentined tubular element.

The method of the invention has utility in the preparation of various types of curved elastomeric tubular articles such as curved hose or tubing.

BRIEF DESCRIPTION OF THE DRAWINGS

The invention in one of its embodiments will be more particularly described with reference to the accompanying drawings, in which.

PREFERRED EMBODIMENTS OF THE INVENTION

For illustrative purposes only, the invention will be described with reference to the production of curved automotive coolant hose.

Figure 2:
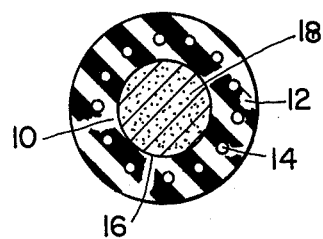
FIG. 2 is a cross sectional view taken along section 2—2 of FIG. 1 showing the hose as a cured composite.

Referring to the drawings, the first step of the process involves preparation of a flexible uncured hose preform composed of an inner tube 10 made of suitable heat setting elastomeric material, an outer cover 12 also of heat setting elastomeric material, compatible with the tube stock, and one or more layers of interposed reinforcement 14 twined about the tube member. The element is tubular and preferably cylindrical in shape interiorly of which is defined a passageway 16 for conveying fluids during use (shown filled with the flexible mandrel core 18). The hose may be formed in any customary fashion such as by extruding tube 10 using a tuber, spiralling the reinforcement 14 about the thus extruded tube, and finally extruding outer cover 12 over the reinforced tube. Upon curing, as differentiated from the uncured or green state, the reinforcement will be fully embedded within the hose body as shown in FIG. 2.

The reinforcement may typically be woven, or twined about the inner tube in the form of a knit, braid or spiral, for instance, and multiple plies may be utilized. Typical reinforcement materials include textiles and wire in the form of filaments, twisted strands, cords and the like, as desired. Discrete dispersed fiber loading may alternatively serve as the reinforcement. The invention also contemplates the manufacture of curved elastomeric tubular elements lacking any reinforcement, or alternatively a reinforced tube lacking a protective cover member.

Typical elastomeric materials which may be used as the tube or cover member include heat setting, preferably natural and synthetic rubbers, exemplified by SBR, neoprene and ethylene propylene diene monomer (EPDM). These natural and synthetic rubbers may be blended with elastomeric thermoplastics and thermosets such as urethanes, polyvinylchloride, polyesters, silicones and polypropylene, for instance. The tube and cover may be of the same or different but compatible elastomers. By "heat setting" is meant that the material flows in a plastic state upon application or generation of heat, and then sets upon cooling, preferably taking a final thermoset (e.g., cross-linked) configuration.

Once a length of the uncured hose has been preformed, it may be cut to length and, according to the invention, the hollow interior 16 of the element is filled with a flowable core material 18 which will function as a flexible mandrel during curing of the element. The term flowable is used in its ordinary sense, meaning that the material in aggregate is nonrigid so as to readily deform under stress while filling the hollow interior of the tubular element to provide a substantially incompressible internal core. The preform hose element together with its core is readily flexible to accommodate a desired serpentine configuration. The substantially incompressible material may either be solid, for instance, in friable or granular form, exemplified by granules of a salt such as sodium chloride, or is in liquid form, such as ordinary water. In either case, it is critical that the incompressible mandrel material be compatible (i.e., nondestructive) with respect to the tube stock 10 and be capable of essentially total removal from the hollow interior of the element after it has been cured. Thus, if a granular material is employed, it is preferred that it is soluble in a suitable solvent, such as water, so that it may be flushed from the finished article by dissolution and purging with the solvent. Granular materials such as sand which are not readily removable or soluble in a suitable solvent (which solvent is also compatible with the hose tube 10) are not contemplated by the invention.

In one form for filling the tubular element, a first end of the preformed hose is plugged with a suitable stopper 20 held in position securely by screw-type clamp means 22. The preform may then be filled through the remaining, open end of the hose so that the granular or liquid core fills the interior volume of the hose element. Thereafter, the remaining end is plugged with stopper 20' secured by clamp 22'. The thus filled tubular element is next made to conform to its desired end serpentine configuration by training the element about a series (at least one) of discrete support means such as rollers 24, shown supported schematically to a suitable frame 26 (which illustration is deleted for clarity) so positioned to train the tubular element in the desired predetermined serpentine configuration. It is preferred that the support means have a U-shaped surface of a bend radius at least as great as the hose element with which it will be associated for curing, to provide a complementary fit. The support means are thus positioned at each of the radiused portions of the desired bends and they take on various attitudes and shapes to conform the bends to their desired curvature. Clearly, support means other than rollers are useful for the invention, an additional example being a U-shaped saddle.

The above described sequential steps of filling the hose preform followed by bending and threading the filled hose about the discrete supports may be reversed.

While the roller support 24 may be rigidly connected to frame 26 it may be desirable to provide means for withdrawing the roller supports after completion of curing and prior to introduction of the next succeeding hose segment. In this respect, withdrawal means 28 such as an air actuated cylinder may be employed to successively retract and extend the roller into its proper supporting location.

The internally disposed incompressible material supports the hose element at each of the bends to prevent collapse and maintain the desired generally circular cross section at those bends. However, despite the provision of the internal support some flattening may occur whereby the internal aspects of the hose will take on an elliptical cross section. In such cases, it is preferred that the ratio of the minor axis to the major axis of the so formed ellipse be at least about 7:10, more preferably at least 9:10.

Once the uncured preform is in position trained about the support means, with internal support being provided throughout the tubular element, the entire assembly is cured whereby the elastomeric elements of the hose become plastic and fuse together into an integral composite resilient hose. Various curing schemes and environments may be employed with the invention. The curing chamber is generally designated at 30, which may represent an open steam autoclave, a fluidized bed containing molten salt, or a radiation chamber, for instance. Because the hose is only supported at discrete or a plurality of points about its external surface, the element is not curable in a mold of the traditional continuous surface type.

If an incompressible material is employed which has a boiling point lower than the curing temperature, which typically may be in the neighborhood of 250°–400° F., then it is preferable to employ a pressure relief valve (not shown) associated with the stopper means 20 in the ends of the hose to permit maintenance of the desired internal supportive pressure in the hose during curing. As an example, when utilizing water as the internal mandrel the pressure valve may suitably be set to vent at a pressure in the range from about 2 to about 50 psi.

Upon curing, the cured hose may be removed from the associated supports 24, and in this respect retracting means 28 (only one of which is shown) may be used. The cured hose is then unplugged and the incompressible internal mandrel material discharged, either by direct liquid flow if the incompressible mandrel material is a liquid, or by dissolution with a suitable solvent and flushing in the case a soluble friable or granular material is employed. It is generally preferred that the incompressible material be removed in a liquid state to insure substantially complete removal with virtually no residue left in the hose. Depending upon the desired end use of the hose, some residue contained in the hose may be tolerable, for instance where the coolant of an automotive cooling system itself flushes the mandrel material.

Since during the curing process heat will have been transferred to the incompressible core material, there may be a certain internal pressure developed which will aid in maintaining the desired cross sectional configuration of the hose at the bend portions. This situation may require use of sturdy clamp means 22 to insure retention of the plugs 20 and 20'.

Figure 1:
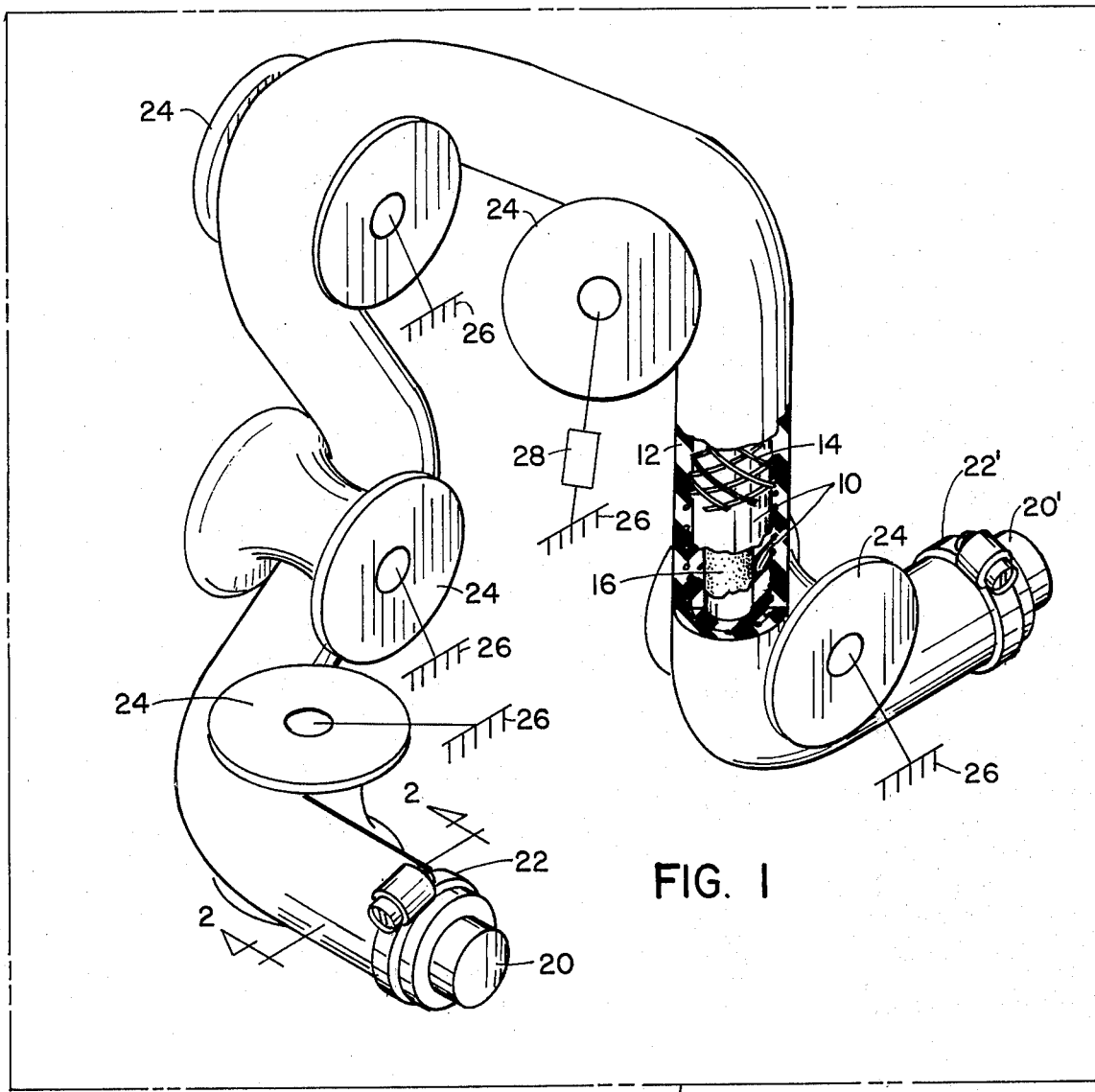
FIG. 1 is a perspective, partial cutaway, partial schematic view of the cured tubular element of the invention in its cured or ready to be cured position.

It is also contemplated that the process of the invention could be conducted on a semi-continuous basis. In one aspect, a very long length of hose is employed and only that segment is cured which is contained within the support fixture shown in FIG. 1. Upon curing, the free end of the hose is pulled through the roller assembly and out of the support apparatus, simultaneously drawing an uncured length of preformed uncured hose into position for curing. The finished hose would then be cut to length and the newly cut end portion of the uncured hose plugged after having compressed the core material for maintenance of the desired internal support, preparatory for a subsequent curing operation.

As a comparative example, the method of the invention was used to produce a serpentine configured hose in which one of the bends was a 180° bend having a bend radius of 1½ times the internal diameter of the hose. For an identical 180° bend, the solid metal mandrel method required a bend radius of twice the internal diameter of the hose.

A variety of modifications and variations will become apparent to those skilled in the art upon a reading of the specification, and are intended to be included within the present invention as defined by the claims appended hereto.

What is claimed is:

1. A method for producing elastomeric tubular articles of a predetermined fixed serpentine configuration having at least one bend portion, comprising:
   preparing a flexible, at least partially uncured length of an elastomer tubular element;
   filling the hollow interior of the element with a flowable substantially incompressible material which is capable of substantially total removal from the hollow interior upon curing of the tubular article;
   training the thus filled tubular element about discrete unconnected support means in contact with the exterior surface of the tubular element at spaced positions along its length and intermediate the ends, in a manner so as to dispose the tubular element in substantially its said serpentine configuration while precluding said bend portion(s) from collapse; and
   curing the filled, serpentined tubular element.

2. The method of claim 1 including the additional steps of:
   removing the cured element from its associated support means; and
   discharging the incompressible material from the interior of the tubular element.

3. The method of claim 2 wherein the incompressible material is discharged from the interior of the tubular element in a liquid state.

4. The method of claim 1 wherein the elastomeric tubular element comprises an inner tube and outer cover of heat setting elastomeric material in which is embedded an annular reinforcement.

5. The method of claim 1 wherein the incompressible material is a granular material which is dischargeable from the hollow interior of the element by flushing with a solvent in which the incompressible material is soluble.

6. The method of claim 1 wherein during curing of the filled, serpentined tubular element the incompressible material is maintained under a pressure such that the bend portions trained about the discrete support means form an ellipse in cross section, the ratio of the minor axis of which to the major axis of which is at least about 7:10.

7. The method of claim 1 wherein the incompressible material is a liquid compatible with the interior portion of the tubular element.

8. The method of claim 7 wherein the liquid is water.

9. The method of claim 8 wherein the ends of the tubular element are plugged with stop means at least one of which is provided with a pressure relief valve set at a positive venting pressure of from about 2 to about 50 psi.

10. The method of claim 1 wherein the filled, serpentined tubular element is cured in a steam autoclave.

11. A method for producing curved resilient rubber hose of a predetermined permanently fixed serpentine configuration comprising:
    preparing a flexible, at least partially uncured length of a hose element;
    filling the hollow interior of the hose with a flowable substantially incompressible friable, granular or liquid material which is capable of total removal from the hollow interior in a liquid state upon curing of the tubular article;
    positioning the thus filled hose about a plurality of spaced and unconnected discrete U-shaped support means contacting each of the inner, radiused portions of the bend segments of the hose along its length in a manner so as to dispose the tubular element in substantially its said serpentine configuration while precluding said bend portions from collapse;
    curing the filled, serpentined hose;
    removing the cured hose from its associated U-shaped support means; and
    discharging in a liquid state the incompressible material from the interior of the hose element.

12. The method of claim 11 wherein said incompressible material is a granular water-soluble salt.

13. The method of claim 11 wherein the incompressible material is water.

14. The method of claim 11 wherein the uncured length of hose element is long enough to make a multiplicity of said curved hoses, and wherein upon curing the filled, serpentined hose, the cured end is pulled through the U-shaped support means to advance an uncured portion of the length of hose into position for subsequent curing in the U-shaped support means.

* * * * *